Dec. 29, 1970 E. C. FRAZE Re. 27,017

CAN END WITH FOLDED PULL TAB

Original Filed Feb. 17, 1966 2 Sheets-Sheet 1

INVENTOR:
ERMAL C. FRAZE

By Smyth, Roston & Pavitt

ATTORNEYS

CAN END WITH FOLDED PULL TAB

Original Filed Feb. 17, 1966 2 Sheets-Sheet 2

INVENTOR:
ERMAL C. FRAZE

By Smyth, Roston & Pavitt
ATTORNEYS

United States Patent Office

Re. 27,017
Reissued Dec. 29, 1970

27,017

CAN END WITH FOLDED PULL TAB

Ermal C. Fraze, 355 W. Stroop Road,
Dayton, Ohio 45429

Original No. 3,439,833, dated Apr. 22, 1969, Ser. No. 732,475, Apr. 25, 1968, which is a continuation of Ser. No. 528,250, Feb. 17, 1966. Application for reissue Sept. 25, 1969, Ser. No. 877,917
Int. Cl. B65d *17/20, 17/24*
U.S. Cl. 220—54 32 claims

Matter enclosed in heavy brackets [ ] appears in the original patent but forms no part of this reissue specification; matter printed in italics indicates the additions made by reissue.

ABSTRACT OF THE DISCLOSURE

A can top is formed with a tear strip having its leading end directed toward the periphery of the can top and a pull tab for manual severance of the tear strip has a relatively long upper arm to serve as a pull handle and a relatively short arm spaced below the upper arm and connected to the upper arm by a U-shaped bend. The shorter lower arm is rigidly connected to the leading end of the tear strip and is shaped to fulcrum against the tear strip to initiate severance of the tear strip.

This application is a continuation of my copending application Ser. No. 528,250 filed on Feb. 17, 1966, now abandoned. This invention relates to a container having a portion of its wall weakened to serve as a tear strip and having a tab attached to the tear strip to serve as manual means for severing the tear strip to form an opening for access to the contents of the container.

In general, the invention is directed to certain needs for improvement which have become increasingly pressing with widespread acceptance of this type of container.

One important need arises from the fact that severed tear strips with tabs attached thereto are commonly discarded at random and are not as readily gathered up as the cans themselves. In consequence, the discarded members accumulate, especially along highways, at picnic areas and at beaches. In fact the troublesome accumulation of the discarded members in beach sands has led in some instances to the enactment of local ordinances prohibiting this type of easy opening can.

The invention meets this need by scoring the can top to form a tear strip which at its base end is permanently attached to the can top. To open the can, the tear strip is merely partially severed and peeled back instead of being completely severed. A certain problem arises, however, in that the partially severed tear strip remains connected at one end of the can opening and if the severance action is radially outward of the can top, as in the usual construction, the attached tear strip is in the way of a user who desires to drink a liquid content directly from the can. This problem is met by reversing the orientation of the tear strip so that the peeling action is radially inward to leave the attached tear strip out of the way in the central region of the can top.

Other needs arise from the fact that this type of container is commonly used for confining beverages, such as carbonated beverages, under fluid pressure which in hot weather may approach 100 p.s.i. One result of such high pressure is that the can top bulges outwardly to reduce the available head space between the web of the can top and the plane of the rim of the can. Another consequence is that in such a bulging can top the bending moments are maximum in the center of the can top and therefore the metal is under maximum stress at the center of the can top. A third factor is that when severance of the leading end of the tear strip is initiated, the initially released fluid jets forth at high velocity.

With the usual orientation of the tear strip, the leading end of the tear strip is in the central region of the outwardly bulged can top where the tab is connected to the leading end by a hollow rivet formed in the material of the tear strip. Thus, the hollow rivet is located in the region where the bulging of the can top reduces the head space to the minimum and this location increases the difficulty of meeting the requirement that neither the rivet nor the tab protrude out of the head space. In addition a centrally positioned hollow rivet is in the region of maximum stress of the sheet material of the can top. A further consequence of the central location of the hollow rivet is that the length of the handle portion of the tab cannot exceed the radius of the can top and, in practice, must be shorter than the radius to permit free access to the underside of the handle portion of the tab. A still further result of the central location of the rivet and the short length of the tab is the difficulty of protecting the user from a jet of initially released pressurized fluid.

The new arrangement of the present invention shifts the hollow rivet from the central region of minimum head space and maximum material stress to the radially outer region of maximum head space and minimum material stress. In addition the new location makes it possible to employ a tab having a handle portion that is substantially longer than the radius of the can top. Finally, the new location simplifies the problem of protecting the user from the initial release of the pressurized fluid.

With reference to the increased length of the handle portion and the problem of controlling the initial fluid jet, a feature of the invention is the concept of employing a tab that has a bend of 180° dividing the tab into a relatively short lower arm connected to the leading end of the tear strip and a relatively long upper arm or handle spaced above the lower arm. Preferably the 180° bend of the tab is backed up to the rim or chime of the can top with the upper arm or handle extending away from the rim substantially diametrically of the can top and just under the plane of the rim of the can. Thus the length of the handle or upper arm may far exceed the radius of the can top and with the 180° bend in the tab backed up to the chime, the initial release of the pressurized fluid is directed away from the user's hand and both the lower arm of the tab and the chime itself serve as baffles to control the released fluids.

Finally, the invention meets the need for a tab that may be initially grasped easily and may be firmly held for carrying out the operation of opening the can. The fact that the reversely bent handle portion lies closer to the outer plane of the can rim than to the web of the can top in itself facilitates initial grasping of the handle portion. Of further importance in this regard is the fact that the new construction makes it possible to provide a relatively large ring-type tab that is large enough to receive a man's finger and thus furthers the convenience of opening the can.

The concept of employing a tab of the character described with a bend of approximately 180° raises the problem of how to attach the lower short arm of the tab to the leading end of the tear strip since the upper arm overhangs the shorter lower arm to interfere with the operation of staking the hollow rivet. This problem is met by the large aperture in the ring-shaped upper arm being located for easy access of tooling therethrough to stake the hollow rivet.

The features and advantages of the invention may be understood from the following detailed description and the accompanying drawings.

In the drawings, which are to be regarded as merely illustrative:

Figure 1:
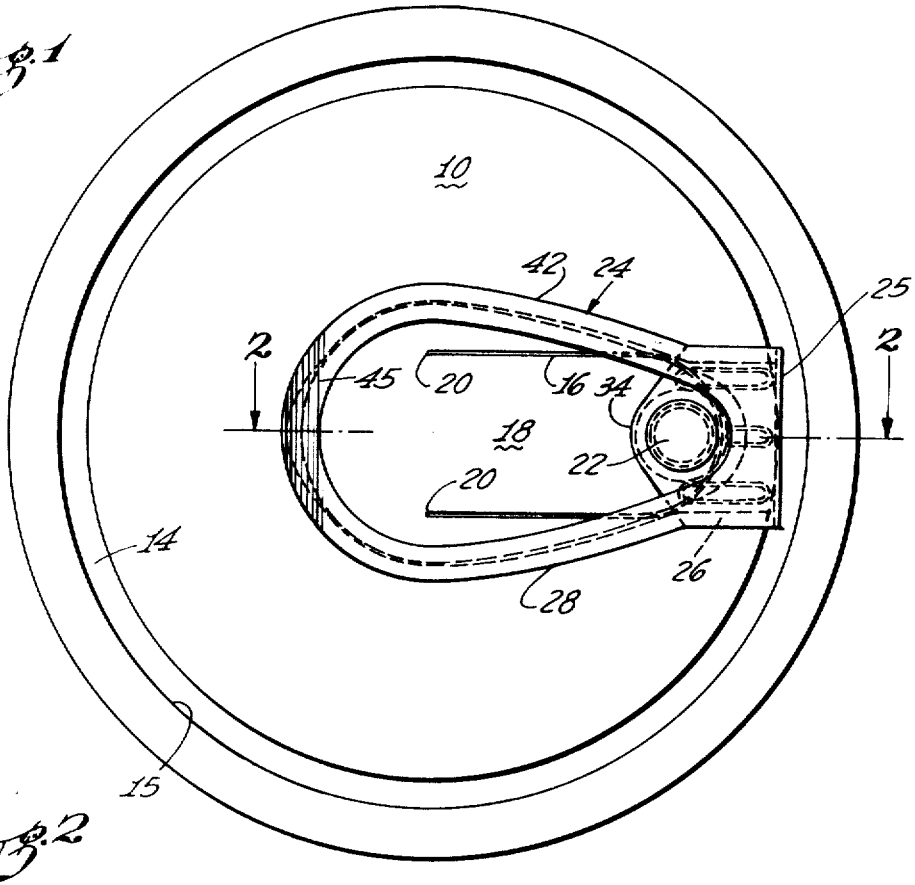
FIG. 1 is a plan view of a can top incorporating a selected embodiment of the invention.
Figure 2:
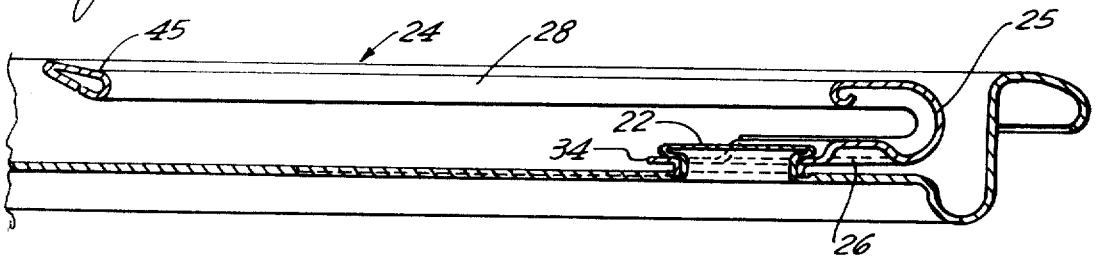
FIG. 2 is an enlarged fragmentary section taken along line 2—2 of FIG. 1.
Figure 4:
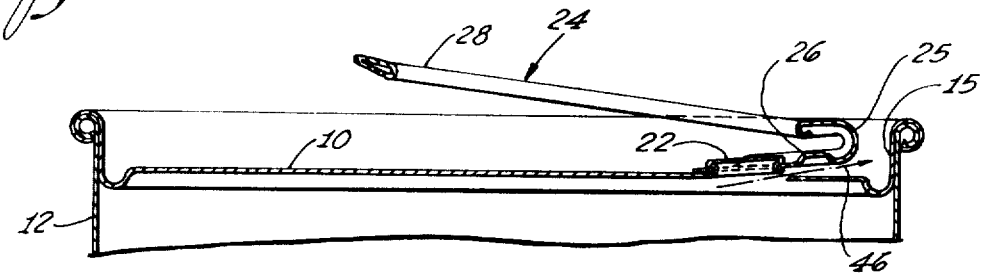
FIG. 4 is a fragmentary sectional view of the top portion of a can showing the initiation of the severance action by the pull tab.
Figure 5:
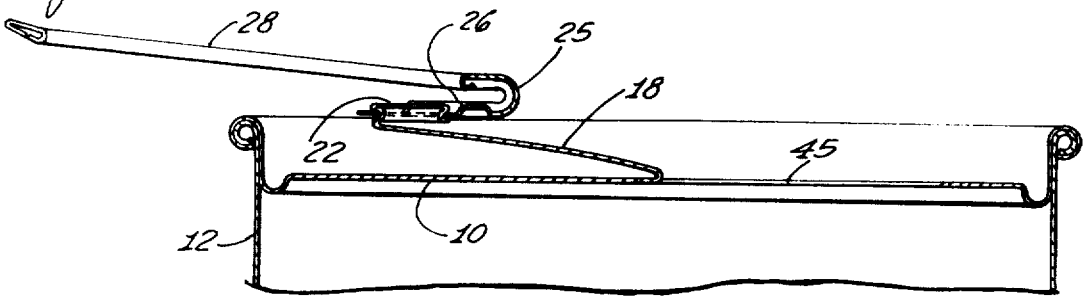
FIG. 5 is a similar view showing the severance action completed.

FIGS. 1 and 2 illustrating one embodiment of the invention show the metal top 10 of a can that is intended to contain a beverage under pressure, the can being made of a suitable material such as aluminum or steel. In preparation for joining the can top to a cylindrical body the can top 10 is offset in a conventional manner to form a circumferential groove 14 and an upstanding peripheral flange 15, which flange forms the rim of the finished can as shown in FIGS. 4 and 5.

To weaken the can top 10 to form a tear strip, the can top is scored along a U-shaped line 16 to form a tear strip 18 with the leading end of the tear strip near the rim flange 15 and with the base end of the tear strip in the central region of the can top. The base end of the tear strip is defined by the two ends 20 of the line of scoring 16 and since the scoring does not extend across the base end of the tear strip the tear strip is permanently connected to the rest of the can top.

The leading end of the tear strip 18 is formed with a hollow rivet 22, as best shown in FIG. 2, which is employed to connect a sheet metal tab, generally designated 24, to the leading end of the tear strip.

[In the preferred practice of the invention, the tab 24 is made of a suitable grade of steel which is relatively stiff but has some resiliency.] The tab 24 is formed with a 180° bend 25 that divides the tab into a relatively short lower arm *or lever portion* 26 which is connected to the leading end of the tear strip and a relatively long upper arm 28 which constitutes the handle portion of the tab.

Figure 3:
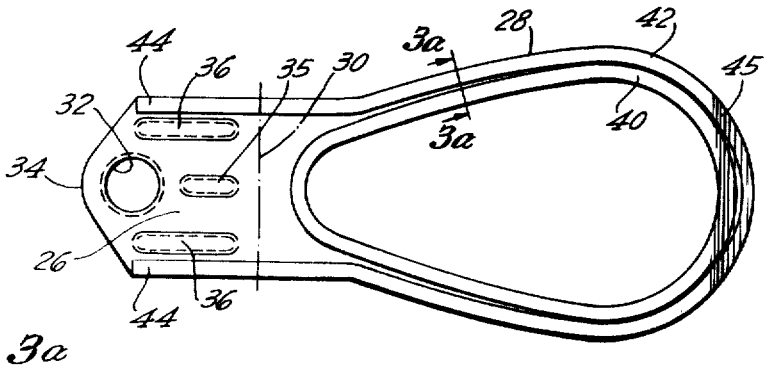
FIG. 3 is a plan view of the tab prior to the final step of bending the tab.

The structure of the tab 24 may be understood by first referring to FIG. 3 which shows the tab in plan prior to the final step of bending the tab through the angle of 180°. In FIG. 3 the broken transverse line 30 locates the middle of the 180° bend. The short arm 26 of the tab to the left of the broken line 30 is intended to serve as a second class lever to fulcrum against the tear strip to initiate severance of the tear strip. A suitable aperture 32 spaced from the fulcrum end 34 of the lower arm is provided to receive the hollow rivet 22 and the lever or short lower arm 26 may be stiffened by a short central embossed rib 35 and two longer flanking embossed ribs 36.

The relatively long arm 28 which in FIG. 3 lies to the right of the broken line 30 is preferably of the character of a ring, being formed with a relatively large aperture 38 which may be egg-shaped as shown and which is large enough to receive a man's index finger. The rim of the large aperture 38 is turned to form a continuous curved flange or bead 40 which gives the aperture a smooth rounded surface against which substantial finger pressure may be exerted with comfort. The outer margin of the tab is turned to form an outer generally U-shaped curved flange or bead 42 having two end portions 44 terminating on opposite sides of the rivet-receiving aperture 32. It is to be noted that these two end portions 44 of the marginal bead further stiffen the short lower arm 26 for its lever action. In addition the headed hollow rivet 22 shown in FIG. 2 further stiffens the short lower arm of the tab.

Figure 3A:
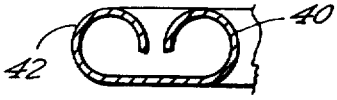
FIG. 3a is an enlarged fragmentary section taken along line 3a—3a of FIG. 3.

Preferably both of the beads 40 and 42 are turned toward each other so that the ring-shaped handle is of hollow or tubular construction as shown in cross section in FIG. 3a. The ring-shaped handle in the final form shown in FIG. 1 is bent slightly upward at its outer *or handle* end along the transverse line 45 to facilitate access to the underside of the handle and, accordingly, in FIG. 3 where the tab is shown in flat state the outer end of the handle is bent downward along the line 45. In FIG. 3 where the tab lies flat prior to the bending operation, the two beads 40 and 42 are turned up whereas *when* the handle is reversed by the 180° bend [and] *shown* in FIG. 1 the two beads 40 and 42 are turned downward. Thus the upper surface of the finished ring-shaped handle in FIG. 1 is smooth and continuous. *As shown in FIGS. 1 and 2 the handle portion 28 extends from its juncture with the lever portion toward and beyond the rivet 22.*

It is apparent in FIGS. 1 and 2, that after the 180° bend is formed in the tab, the short inner arm 26 may be readily attached to the leading end of the tear strip because of the access provided by the size and location of the relatively large aperture 38 of the handle. No difficulty is encountered in inserting tooling through the large aperture 38 to stake the hollow rivet 22. *With the tab 24 attached to the tear strip 18, the handle end of the handle portion 28 and the juncture of the handle portion 28 and the lever portion 26 lie on opposite sides of the rivet 22 as shown in FIG. 1.*

The manner in which the tab is manipulated for opening the can may be readily understood from the foregoing description. The user's thumb is inserted under the outer end of the ring-shaped tab to grip the underside of the tab with the user's index finger extending into the large aperture 38 of the handle. The user then exerts upward pull on the ring-shaped handle. With the fulcrum end of the short arm or stiff lever 26 anchored to the tear strip by the hollow rivet 22, the reaction to the manual pull on the ring-shaped handle causes the lever or short lower arm 26 to tilt upward and thereby fulcrum on the tear strip to tilt the hollow rivet in the leading end of the tear strip upward to initiate severence of the tear strip as indicated in FIG. 4. To accommodate the upward swinging movement of the lever or short arm 26, the long arm or ring-shaped handle may resiliently flex slightly and the 180° bend may resiliently open slightly. Continued pull on the tab causes the tear strip to be severed along the length of the two legs of the line of scoring 16 with the consequence that the leading end of the tear strip is folded back on the remainder of the tear strip as may be seen in FIG. 5.

At the end of the operation of partially severing the tear strip, the tab and the tear strip are positioned out of the way as shown in FIG. 5 leaving the newly formed opening 45 in the can top clear and freely available so that the contents may be poured out through the opening or, if desired, the user may drink the contents of the can directly from the opening. It is to be understood, however, that if desired the tear strip may be scored across its base end for complete removal of the tear strip.

It is to be noted in FIG. 4 that the initial release of the pressurized fluid is in a direction away from the handle and away from the user as indicated by the arrow 46. It is important to note further that the lever or short arm 26 at the position shown in FIG. 4 serves as a baffle to keep the jet of initially released fluid at a relatively low angle, the angle being so low that the outer flange 15 of the can top serves as a baffle directly in the path of a liquid stream. By virtue of this arrangement the initially released fluid is kept under control and its energy is dissipated.

Figure 6:
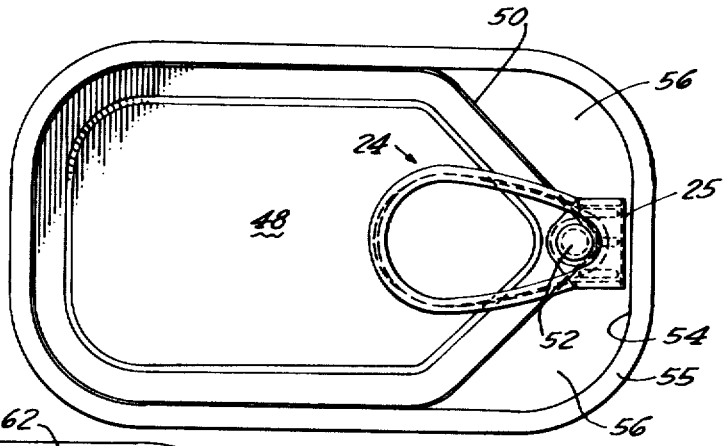
FIG. 6 is a plan view of a low flat generally rectangular can incorporating another embodiment of the invention.

FIG. 6 shows a low flat can of generally rectangular configuration with rounded corners, the can being of the character of a common sardine can. In this case it is contemplated that the tear strip will constitute the major area of the flat can top and since the tear strip with a reversely bent tab attached thereto is a relatively large object, there is no reason for not completely severing the tear strip from the can. Actually, it is usually desirable to remove the tear strip completely to get it out of the way. In FIG. 6 the tear strip 48 is formed by a continuous line of scoring 50 and the scoring is convergent to cause the tear strip to taper to a leading end where the tear strip is attached by a hollow rivet 52 to a tab 24 of the construction heretofore described. It is to be noted that the 180° bend 25 of the tab 24 backs against the flange 54 of the can top at one end of the can. In the usual manner the ring-shaped handle of the tab lies below the plane of the rim 55 of the can that is formed by the flange 54.

Figure 7:
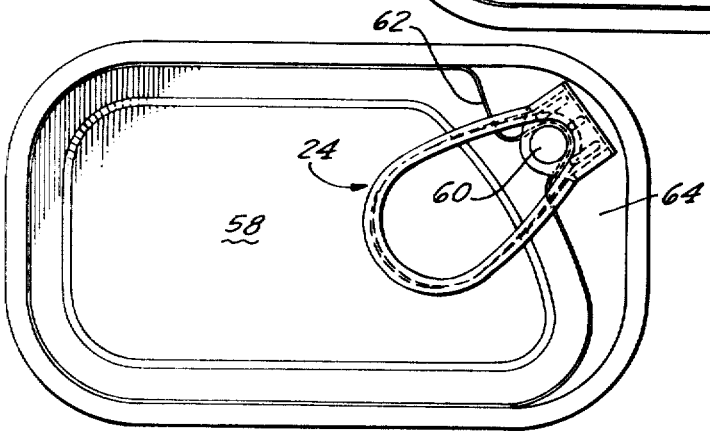
FIG. 7 is a plan view of another low flat can of rectangular configuration incorporating another embodiment of the invention.

In FIG. 6 the complete removal of the tear strip 48 leaves two relatively large corner areas 56 of the can top in place to overhang corresponding portions of the contents of the can. Since there may be some inconvenience in removing the contents from these corners of the can, it may be desirable to form the tear strip to the configuration shown in FIG. 7. In FIG. 7 a tear strip 53 is attached to a reversely bent tab 24 by the usual rivet 60 but the line of scoring 62 forms the tear strip with a tongue or leading end that is positioned in one corner of the can top. With the tear strip of this configuration the removal of the tear strip leaves a portion 64 of the can top that is of relatively small area and it is relatively easy to remove the portion of the content of the can that is overhung by the portion 64 of the can top.

My description in specific detail of the selected embodiments of the invention will suggest various changes, substitutions and other departures from my disclosure within the spirit and scope of the appended claims.

I claim:

1. In a can of the character described, the combination of:

a can top offset inwardly from the rim of the can to provide a given head space between the outer surface of the can top and the plane of the rim, said can top being weakened to form a tear strip having a leading end and an opposite base end, said base end of the tear strip being in the central region of the can top with the leading end extending from the central region towards the rim of the can; and a pull tab lying in said head space and rigidly attached to the leading end of the tab to be pulled towards the base end of the tear strip to pull the leading end of the tear strip from the can top, said pull tab having an initial configuration characterized by a relatively long upper arm to serve as a pull handle and a relatively short arm spaced below the level of the long arm and rigidly connected near its outer end to the leading end of the tear strip with the two arms integrally interconnected by a relatively rigid U-shaped bend in the tab, said relatively short lower arm being rigid throughout to substantially maintain the initial configuration of the tab throughout the pulling action of the tab;

said lower arm being positioned to fulcrum at its outer end against the tear strip in the region of the tear strip between the base end of the tear strip and the point of attachment of the tab to the tear strip.

2. A combination as set forth in claim 1 in which the tear strip is not weakened across its base end so that the tear strip is permanently attached to the rest of the can top and is only partially severed from the can top by manipulation of the tab.

3. A combination as set forth in claim 2 in which the can top is circular; and in which the tear strip extends substantially radially of the can top with the leading end close to the rim of the can top whereby the partially severed tear strip may be folded back to leave an opening extending close to the rim to permit the user to drink directly from the can while the partially severed tear strip is attached thereto.

4. A combination as set forth in claim 1 in which said lower shorter arm is shaped and dimensioned to serve as a lever to fulcrum on the tear strip for lifting action on the leading end of the tear strip; and in which said longer upper arm is slightly flexible to permit the lever action of the lower arm.

5. A combination as set forth in claim 1 in which the outer end of said upper arm is bent upward to facilitate manually grasping the tab from below.

6. A combination as set forth in claim 1 in which the can top is circular; and in which the length of the upper arm is greater than the radius of the can top inside the rim.

7. A combination as set forth in claim 1 in which the upper arm has a large aperture giving the handle portion the general configuration of a ring large enough to receive a man's index finger.

8. A combination as set forth in claim 1 in which the upper arm overhangs the leading end of the tear strip and has a relatively large aperture for access therethrough to the minor portion of the tab to facilitate attachment of the lower arm of the tab to the leading end of the tear strip.

9. A combination as set forth in claim 8 in which the lower arm of the tab is attached to the leading end of the tear strip by a hollow rivet formed in the tear strip and said aperture in the upper arm is large enough for tooling to extend therethrough for staking the rivet.

10. In a can of the character described, the combination of:

a can top having a rim flange to provide a given head space between the outer surface of the can top and the plane of the rim of the can, said can top being weakened by a line of scoring forming a tear strip, the line of scoring extending around the leading end of the tear strip and along the sides of the tear strip but not across the base end of the tear strip whereby the base end is permanently attached to the rest of the can top, the leading end of the tear strip lying relatively close to the rim of the can top with the base end in the central region of the can top; and a tab having a bend of substantially 180° dividing the tab into a relatively short lower arm close to the plane of the tear strip and a relatively long upper arm spaced above the lower arm close to said plane of the rim, said short lower arm being a lever connected to the leading end of the tear strip and positioned to fulcrum on the can top within the area of the tear strip in the region of the tear strip between the base end of the tear and the point of attachment of the tab to the tear strip.

11. A combination as set forth in claim 10 in which said tab is made of relatively stiff resilient sheet metal.

12. A combination as set forth in claim 10 in which said tab has a relatively long aperture, the metal defining the aperture being bent to form a smooth rim.

13. A combination as set forth in claim 10 in which said minor portion of the tab is connected to the leading end of the tear strip by a hollow rivet formed in the tear strip, said aperture of the tab being over the rivet to make the rivet accessible through the aperture.

14. A combination as set forth in claim 10 in which the 180° bend of the tab backs up to the rim flange of the can to direct initially released fluid against the rim flange and to cooperate with the rim flange to confine the released fluid.

15. A tab attachable to a tear portion of an easy-opening container wall to initiate severance of the tear portion from the container wall comprising:

a lever portion of sheet material, one end portion of the lever portion being attachable to the tear portion adjacent the periphery of the tear portion, said lever portion extending outwardly from said one end portion to define an outer end portion, said lever portion having integral stiffening means for making said lever portion substantially longitudinally rigid; and a handle portion of sheet material integrally joined to the outer end portion of said lever portion, said handle portion overlying at least a portion of said lever portion and extending from its juncture with the lever portion back toward said one end portion of said lever portion, said handle portion defining a gripping element which may be grasped and pulled by the user to cause said lever portion to apply a force to the tear portion tending to initiate removal thereof, a region of the sheet material of the handle portion being formed into a bead to stiffen said handle portion.

16. A tab as defined in claim 15 wherein said gripping element includes a narrow portion shaped to partially enclose an area.

17. A tab as defined in claim 16 wherein said elongated narrow portion is defined at least in part by said bead and a second closely adjacent bead.

18. A tab attachable with a rivet to a tear portion of an easy-opening container wall to initiate severance of the tear portion from the easy-opening container wall comprising:

a lever portion of sheet material having an aperture therein for receiving the rivet to attach the tab to the tear portion, said lever portion extending outwardly from said aperture to define an outer end portion, said lever portion having integral stiffening means for making said lever portion substantially longitudinally rigid; and a handle portion of sheet material integrally joined to the outer end portion of said lever portion by a bend portion of sheet material, said handle portion overlying at least a portion of said lever portion and extending from said bend portion back toward said aperture, said handle portion defining an opening therein for receiving the finger of a user, a region of the sheet material of the handle portion at least partially surrounding said opening being curled to stiffen the handle portion and to define a relatively smooth surface against which the finger of a user may bear during manipulation of the tab.

19. A tab as defined in claim 18 wherein said stiffening means includes longitudinally extending segments of the sheet material of the lever portion deformed out of the plane of the lever portion.

20. A tab as defined in claim 18 wherein said handle portion is longer than said lever portion and said aperture in said lever portion lies directly beneath said opening in said handle portion.

21. A tab as defined in claim 18 wherein a peripheral region of the sheet material of the handle portion is deformed to form an outer reinforcing bead which extends for a major distance around said handle portion.

22. A tab integrally constructed of a single piece of sheet material and attachable with a rivet to a tear portion of an easy-opening container wall to initiate severance of the tear portion from the container wall comprising:

a lever portion of sheet material having an aperture therein for receiving the rivet to attach the tab to the tear portion, said lever portion extending outwardly from said aperture to define an outer end portion, said lever *portion* having longitudinally extending segments of the sheet material thereof deformed out of the plane of the lever portion to stiffen said lever portion longitudinally;

a handle portion of sheet material integrally joined to the outer end portion of said lever portion by a bend portion, said handle portion overlying at least a portion of said lever portion and extending from said bend portion back toward said aperture, said handle portion being longer than said lever portion;

said handle portion defining an opening therein for receiving the finger of a user whereby a pulling force can be exerted on said outer end of said lever *portion*, the sheet material of a zone immediately surrounding the opening being turned downwardly to form an inner reinforcing bead which extends substantially completely around said opening;

a marginal portion of the sheet material of said handle portion being turned downwardly to define an outer reinforcing bead which extends around a major portion of said opening, said outer bead lying outwardly of said inner bead and lying closely adjacent thereto over at least some of the length of said outer bead; and the sheet material adjacent said bend portion being sufficiently pliable to permit at least limited relative pivotal movement of the handle portion relative to the lever portion when the lever portion is attached to the tear portion.

23. In an easy-opening container wall, the combination of:

a line of weakness in said container wall defining a tear portion at least partially removable from the container wall to form an opening therein;

a tab integrally constructed of sheet material having a lever portion and a handle portion joined to and at least partially overlying the lever portion;

means for attaching the lever portion to the tear portion closely adjacent the line of weakness, said lever portion extending from said attaching means across said line of weakness and being at least substantially longitudinally rigid from said attachment means to a region overlying the container wall outside of the line of weakness; and said handle portion being joined to the lever portion outside the line of weakness, said handle portion defining a grip portion which the user may grasp and pull to apply a force to the lever portion to initiate severance of the tear portion from the container wall, said handle portion extending from its juncture with the lever portion back over at least a segment of said lever portion and over at least a segment of said tear portion, a region of the sheet material of said handle portion being bent to form a stiffening bead.

24. A combination as defined in claim 23 wherein said grip portion includes a narrow region of said handle portion, a first segment of the narrow region extending in a first direction and a second segment of the narrow region extending in a second direction to at least partially enclose an area and to define finger receiving means to facilitate the grasping of the handle portion.

25. In an easy-opening container wall, the combination of:

a line of weakness in said container wall defining a tear portion at least partially removable from the container wall to form an opening therein;

a tab integrally constructed of sheet material having a lever portion and a handle portion joined to the lever portion by a bend portion, said handle portion overlying at least a segment of said lever portion;

said lever portion having integral stiffening means for making said lever portion substantially longitudinally rigid;

means for attaching the lever portion to the tear portion closely adjacent the line of weakness; and said handle portion defining an opening therein for receiving the finger of a user, a region of the sheet material of said handle portion at least partially surrounding said opening being curled to stiffen said handle portion and to define a relatively smooth surface against which the finger of the user may bear during manipulation of the tab.

*26. A tab attachable to a tear portion of an easy-opening container wall to initiate severance of the tear portion from the container wall comprising:*

*a lever portion of sheet material, one end portion of said lever portion being attachable to the tear portion adjacent the periphery of the tear portion, said lever portion extending away from said one end portion to define a lifting portion, said lever portion having integral stiffening means for making said lever portion substantially longitudinally rigid; and*

*a handle portion of sheet material integrally joined to the lifting portion of said lever portion, said handle portion extending from its juncture with the lever portion generally in the direction of said one end portion of said lever portion, said handle portion defining a gripping element which may be manually grasped and to which a force may be applied to cause said lever portion to apply a force to the tear portion tending to initiate removal thereof.*

*27. A tab as defined in claim 26 wherein said integral stiffening means includes a stiffening segment of sheet material, said stiffening segment being deformed out of the plane of the lever portion.*

*28. An easy opening container wall comprising:*

*a container wall having a line of weakness therein defining a tear portion at least partially removable from the container wall to form an opening therein;*

*a tab integrally constructed of sheet material, said tab having a lever portion and a handle portion joined to the lever portion, the sheet material of said lever portion being deformed to stiffen the lever portion;*

*means for attaching the lever portion to the tear portion closely adjacent the line of weakness, said lever portion extending away from said attaching means and being at least substantially rigid; and*

*said handle portion being joined to said lever portion at a location spaced from said attaching means, said handle portion extending from said location generally in the direction of said attaching means and terminating in a lifting end remote from said location whereby a user may grasp the lifting end and apply a force to the lever portion to initiate severance of the tear portion from the container wall.*

*29. A tab integrally constructed of a single piece of sheet material and attachable to a tear portion of an easy opening container wall to initiate severance of the tear portion from the container wall comprising:*

*a lever portion of sheet material having an attachment location at which the tab can be attached to the tear portion, said lever portion extending away from said attachment location to define a lifting region of said lever portion, said lever portion having segments of the sheet material thereof deformed to stiffen said lever portion;*

*a handle portion of sheet material integrally joined to the lifting region of said lever portion by a connecting portion of sheet material, said handle portion defining an opening therein for receiving the finger of a user, said handle portion extending from its juncture with said lever portion generally in the direction of said attachment location to define a handle end, said handle portion circumscribing at least a portion of the lever portion, the sheet material of a zone immediately surrounding the opening being turned to form an inner reinforcing segment which extends around a major portion of said opening whereby a force can be applied to said handle portion which initiates rupture of the line of weakness through the lever action of said lever portion; and*

*at least one of said connecting portion and said handle portion being sufficiently bendable to permit at least limited relative pivotal movement of the handle portion relative to the lever portion when the lever portion is attached to the tear portion.*

*30. A tab attachable to a container wall to initiate severance of a tear portion from the container wall comprising:*

*a lever portion of sheet material having an attachment location adapted to be attached to the container wall, said lever portion having integral stiffening means for making the lever portion substantially rigid; and*

*a handle portion of sheet material integrally joined to the lever portion at a region spaced from said attachment location, said handle portion defining an opening therein for receiving the finger of a user, said handle portion circumscribing at least a segment of said lever portion and terminating in a handle end remote from said region whereby pulling outwardly on said handle end of said tab causes said lever portion to initiate severance of the tear portion.*

*31. A one-piece tab of sheet material attachable to a tear portion of an easy opening container wall to sever said tear portion from said wall comprising:*

*a segment having means integral therewith for reinforcing and stiffening the same whereby the segment forms a substantially rigid lever means;*

*a handle segment integrally joined to one end of said lever means and extending toward the opposite end of said lever means;*

*means carried by said opposite end of said lever means cooperative with means of the tear portion for attaching the last named end of said lever means to the tear portion; and*

*the handle segment being formed with a finger receiving opening whereby a user may insert a finger through said opening and apply an upwardly directed force to the handle segment thereby lifting the end of the lever means to which said handle segment is integrally joined to apply a severance force to said tear strip.*

*32. A one-piece tab of sheet material attachable to a tear portion of an easy opening container wall to initiate severance of the tear portion from said wall comprising:*

*a lever segment having means at one end thereof cooperative with means of the tear portion for attaching the same one end of the lever segment to the tear portion;*

*means integral with said lever segment for reinforcing and stiffening the same; and*

*a ring-like handle segment integrally joined to the end of said lever segment opposite said one end and extending from said last named end of the lever segment back toward said first named end to at least partially circumscribe said lever segment, said handle segment adapted to receive the finger of a user to permit the user by pulling upon said handle segment to apply a lifting force to the end of the lever to which said handle segment is integrally joined whereby the lever segment applies a severance force to said tear portion.*

References Cited

The following references, cited by the Examiner, are of record in the patented file of this patent or the original patent.

UNITED STATES PATENTS

| | | | |
|---|---|---|---|
| 3,358,873 | 12/1967 | Eller | 220—54 |
| 3,391,820 | 7/1968 | Brown | 220—54 |

GEORGE T. HALL, Primary Examiner